US 9,152,418 B2

(12) United States Patent
Kim et al.

(10) Patent No.: US 9,152,418 B2
(45) Date of Patent: Oct. 6, 2015

(54) APPARATUS AND METHOD OF EXCEPTION HANDLING FOR RECONFIGURABLE ARCHITECTURE

(75) Inventors: Hee Seok Kim, Seoul (KR); Dong-Hoon Yoo, Suwon-si (KR); Jeong Wook Kim, Seongnam-si (KR); Soo Jung Ryu, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1631 days.

(21) Appl. No.: 11/487,407

(22) Filed: Jul. 17, 2006

(65) Prior Publication Data
US 2007/0150711 A1    Jun. 28, 2007

(30) Foreign Application Priority Data
Dec. 28, 2005   (KR) .......................... 10-2005-0131776

(51) Int. Cl.
| | |
|---|---|
| G06F 15/00 | (2006.01) |
| G06F 7/38 | (2006.01) |
| G06F 9/00 | (2006.01) |
| G06F 9/44 | (2006.01) |
| G06F 9/30 | (2006.01) |
| G06F 9/38 | (2006.01) |

(52) U.S. Cl.
CPC .......... *G06F 9/3012* (2013.01); *G06F 9/30105* (2013.01); *G06F 9/30116* (2013.01); *G06F 9/30123* (2013.01); *G06F 9/3863* (2013.01)

(58) Field of Classification Search
USPC ................................................... 712/228, 14
See application file for complete search history.

(56) References Cited

U.S. PATENT DOCUMENTS

| | | | | |
|---|---|---|---|---|
| 5,165,038 | A  * | 11/1992 | Beard et al. ................... | 711/147 |
| 6,058,469 | A  * | 5/2000 | Baxter ............................ | 712/43 |
| 6,108,766 | A  * | 8/2000 | Hahn et al. ..................... | 712/34 |
| 7,447,873 | B1 * | 11/2008 | Nordquist ....................... | 712/22 |
| 2001/0049763 | A1 * | 12/2001 | Barry et al. .................... | 710/264 |
| 2002/0157066 | A1 * | 10/2002 | Marshall et al. ................. | 716/1 |
| 2003/0051124 | A1 * | 3/2003 | Dowling ....................... | 712/244 |
| 2003/0074545 | A1 * | 4/2003 | Uhler ............................ | 712/228 |
| 2005/0125795 | A1 * | 6/2005 | Kissell ......................... | 718/100 |

OTHER PUBLICATIONS

DeHon, Reconfigurable Architectures for General-Purpose Computing, pp. 258-297, Oct. 1996.*

* cited by examiner

*Primary Examiner* — George Giroux
(74) *Attorney, Agent, or Firm* — Sughrue Mion, PLLC

(57) ABSTRACT

A processor including a coarse grained array including a plurality of processing elements, a central register file including a first plurality of register files, a shadow central register file including a second plurality of register files, each of the second plurality of register files corresponding to each of the first plurality of register files included in the central register file, and a plurality of shadow register files, each of the plurality of shadow register files corresponding to each of a third plurality of register files included in predetermined processing elements selected from the plurality of processing elements.

26 Claims, 6 Drawing Sheets

APPARATUS AND METHOD OF EXCEPTION HANDLING FOR RECONFIGURABLE ARCHITECTURE

CROSS-REFERENCE TO RELATED APPLICATIONS

This application claims priority from Korean Patent Application No. 10-2005-0131776, filed on Dec. 28, 2005, in the Korean Intellectual Property Office, the disclosure of which is incorporated herein by reference.

BACKGROUND OF THE INVENTION

1. Field of the Invention

Apparatuses and methods consistent with the present invention relate to a reconfigurable architecture, and more particularly, to processing an exception in a reconfigurable architecture.

2. Description of the Related Art

Traditionally, an apparatus performing an operation is embodied by hardware or software. For example, when a network controller performing a network interface is embodied on a computer chip, the network controller is able to perform only a network interface function defined during fabrication in a factory. After the network controller is fabricated in the factory, changing the function of the network controller is not possible. This is an example of hardware. On the other hand, there is a method of using software. For example, a program for executing a desired function is programmed and the program is executed by a general purpose processor, thereby satisfying a purpose for a user. In the method of using software, a new function may be performed by changing the software after fabricating hardware in a factory. When software is used, various functions may be performed by using a given hardware but there is a drawback of a lower speed than when hardware is exclusively used.

To overcome the problem of the described method of using hardware and software, there is provided a reconfigurable architecture. The reconfigurable architecture can be customized to solve any problem, after device fabrication, and can exploit a large degree of spatially customized computation in order to perform their computation.

FIG. 1 is a diagram illustrating an example of a conventional reconfigurable architecture. In FIG. 1, there is a plurality of arithmetic and logic units (ALUs) 101, 102, 103, 104, and 105. There is a field programmable gate array (FPGA) formed of the plurality of ALUs and a plurality of lines 106 connecting the plurality of ALUs. The FPGA is customized to compute "A*x*x+B*X+C," as an example. If the operation of "A*x*x+B*X+C" frequently occurs, an FPGA as shown in FIG. 1 is formed for the operation, thereby more quickly performing the operation than the method of using software. Also, a configuration of the FPGA may be changed by applying a current to the lines 106 of the ALUs. Therefore, a configuration for computing another operation may be formed by using the lines. As described above, a reconfigurable architecture is architecture capable of performing a new operation by changing a hardware configuration after fabrication.

In FIG. 1, data is inputted to an ALU one bit at a time. This kind of reconfigurable architecture is called as a fine grained array. If data is inputted to a processing element by units of one word at a time, we call this kind of reconfigurable architecture a coarse grained array (CGA).

FIG. 2 is a diagram illustrating an example of a tightly-coupled coarse grained array architecture utilized by the inventors for describing the present invention.

A coarse grained array 210 includes a plurality of processing elements 211. Each of the plurality of processing elements 211 includes a function unit 212 and a register file 213. The function unit 212 performs computations, and the register file 213 is a group of registers temporarily storing data used by the function unit 212.

A configuration memory 220 stores information associated with a configuration of the coarse grained array 210. According to the configuration stored in the configuration memory 220, the coarse grained array 210 changes a connection state between processing elements included in the coarse grained array 210. A data memory 230 is located outside the coarse grained array 210 and stores data.

A central register file 270 is located outside the coarse grained array 210 and stores values computed by the coarse grained array 210.

A processor using a coarse grained array may include a coarse grained array along with another host processor (not shown). In this case, general instructions are performed by the host processor and instructions requiring repeated execution, such as a loop, may be executed by the coarse grained array. A configuration described above, in which a coarse grained array is separated from the host processor, may be called a loosely-coupled coarse grained array.

On the other hand, the processor shown in FIG. 2 uses selected processing elements 280 which are a part of the plurality of processing elements 211 of the coarse grained array 210, as the host processor. Accordingly, general instructions are performed by the selected processing elements 280, and instructions requiring repeated execution, such as a loop, may be executed by the entire coarse grained array 210 including the selected processing elements 280. A configuration using a part of the plurality of processing elements 211 of a coarse grained array as the host processor may be called as tightly-coupled coarse grained array. In the tightly-coupled configuration, there are two modes, an array mode and an instruction set processor mode. In the array mode, the function units of the coarse grained array 210 execute operations according to the configuration stored in the configuration memory 220. Accordingly, in the array mode, the selected processing elements 280 operate as the part of the coarse grained array 210. In the instruction set processor mode, predetermined function units of the function units of the coarse grained array 210 execute operations. The instruction set processor mode processing may be performed by using an instruction fetch/decoder 260, the central register file 270, and the selected processing elements 280.

If the described tightly-coupled configuration is used, a part of the processing elements in a coarse grained array are used as a host processor and an additional host processor is required. Therefore, a size of the processor may be decreased, and a cost of fabricating the processor may be decreased.

However, when an exception occurs in the above described tightly-coupled coarse grained array architecture, it is difficult to process the exception. An exception is an unexpected event occurring during operation in a computer operating system. As examples of exceptions, there are interrupts, a division by zero, undefined instructions, etc. If an exception occurs, a task currently performed is suspended and the exception must be handled. In the tightly-coupled coarse grained array architecture, exception handling may be performed in the instruction set processor mode. Accordingly, when an exception occurs while the tightly-coupled coarse grained array architecture operates in the array mode, the tightly-coupled coarse grained array architecture has to be switched into the instruction set processor mode to handle the exception. In order to switch the array mode into the instruction set processor mode, a context switch is required. The context is information indicating a current state or a condition of a system, which may include values stored in registers. Namely, in the case an exception occurs when an operation is performed in the array mode, the context of the array mode is stored and the exception is handled. When the exception handling is completed, the stored context has to be restored. Namely, current context values including values stored in all register files and the central register file of the coarse grained array are stored in a memory, and then the exception handling is performed. When the exception handling is completed, the context values stored in the memory are restored and the suspended operation is restarted.

However, as shown in FIG. 2, since the coarse grained array includes a large number of register files, an overhead for storing the values of the register files becomes very great. Namely, since the values stored in the large number of register files have to be stored in the memory, a large amount of time is required. Also, since lines for connecting all of the register files to the data memory 230 are required, the entire design becomes very complicated. As described above, to process an exception requiring a context switch, a considerable amount of overhead occurs in the coarse grained array 210, and there has not been any suggestion to solve this problem.

Also, even though the exception occurs in the instruction set processor mode, there is still a problem created by the context switch.

Accordingly, a method of effectively processing an exception occurring in the tightly-coupled coarse grained architecture is required.

SUMMARY OF THE INVENTION

An aspect of the present invention provides a method and apparatus for effectively processing an exception occurring in a tightly-coupled coarse grained array architecture.

An aspect of the present invention also provides a method and apparatus for effectively processing an exception occurring while a tightly-coupled coarse grained array architecture operates in an array mode.

An aspect of the present invention also provides a method and apparatus for effectively processing an exception occurring while a tightly-coupled coarse grained array architecture operates in an instruction set processor mode.

An aspect of the present invention also provides a method and apparatus for effectively processing an exception that is not directly associated with a schedule of a task in a tightly-coupled coarse grained array architecture by not storing or restoring a context, thereby reducing overhead of context switch.

An aspect of the present invention also provides a method and apparatus for effectively processing an interrupt exception used in a real-time operating system in a tightly-coupled coarse grained array architecture.

An aspect of the present invention also provides a method and apparatus for reducing a cost for storing and restoring context, when an exception occurs in a tightly-coupled coarse grained array architecture.

According to an aspect of the present invention, there is provided a processor including: a coarse grained array including a plurality of processing elements; a central register file including a first plurality of register files; a shadow central register file including a second plurality of register files, each of the second plurality of register files corresponding to each of the first plurality of register files included in the central register file; and a plurality of shadow register files, each of the plurality of shadow register files corresponding to each of a third plurality of register files included in predetermined processing elements selected from the plurality of processing elements.

The shadow central register file and the plurality of shadow register files are used in exception handling. The central register file and the third plurality of register files included in the predetermined processing elements selected from the plurality of processing elements are excluded from use in the exception handling.

According to another aspect of the present invention, there is provided a method of processing an exception in a processor comprising a coarse grained array including a plurality of processing elements, and a central register file including a plurality of register files, the method including: processing the exception by using a shadow central file and a plurality of shadow register files, by function units included in predetermined processing elements selected from the plurality of processing elements.

The method further includes the operations of: determining whether the exception occurs in an array mode where the plurality of processing elements of the coarse grained array execute operations; and freezing the plurality of processing elements of the coarse grained array when the exception occurs in the array mode.

The method further includes the operation of: restarting the plurality of processing elements of the coarse grained array after processing the exception.

According to still another aspect of the present invention, there is provided a computer readable recording medium in which a program for executing a method of processing an exception in a processor comprising a coarse grained array including a plurality of processing elements and a central register file including a plurality of register files, the method including: processing the exception by using a shadow central file and a plurality of shadow register files, by function units included in predetermined processing elements selected from the plurality of processing elements.

BRIEF DESCRIPTION OF THE DRAWINGS

The above and other aspects of the present invention will become apparent and more readily appreciated from the following detailed description, taken in conjunction with the accompanying drawings of which.

DETAILED DESCRIPTION OF THE INVENTION

Figure 1:
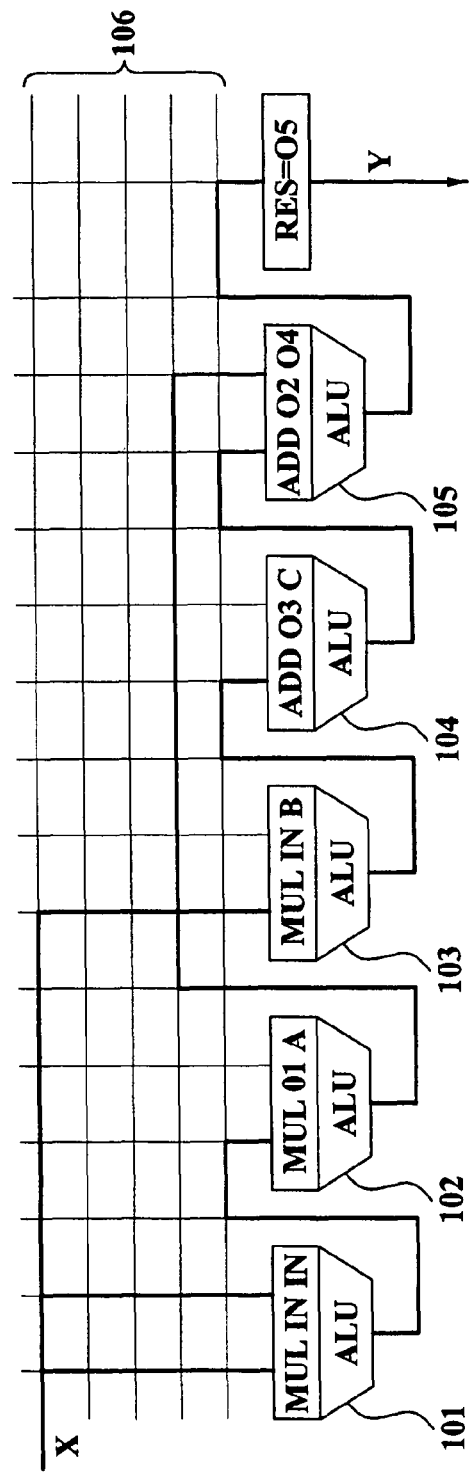
FIG. 1 is a diagram illustrating a reconfigurable architecture in a conventional art.
Figure 2:
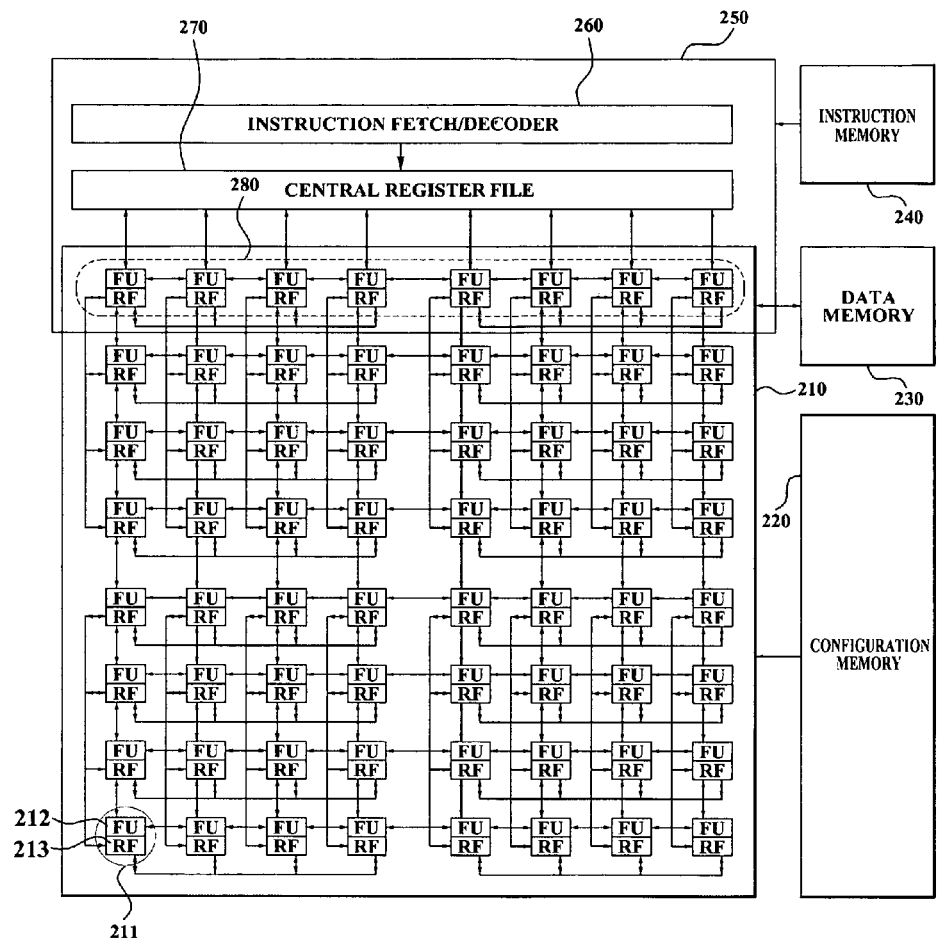
FIG. 2 is a diagram illustrating an example of a tightly-coupled coarse grained array architecture according to an exemplary embodiment of the present invention.

Reference will now be made in detail to the embodiments of the present invention, examples of which are illustrated in the accompanying drawings, wherein like reference numerals refer to the like elements throughout. The exemplary embodiments are described below to explain the present invention by referring to the figures.

Figure 3:
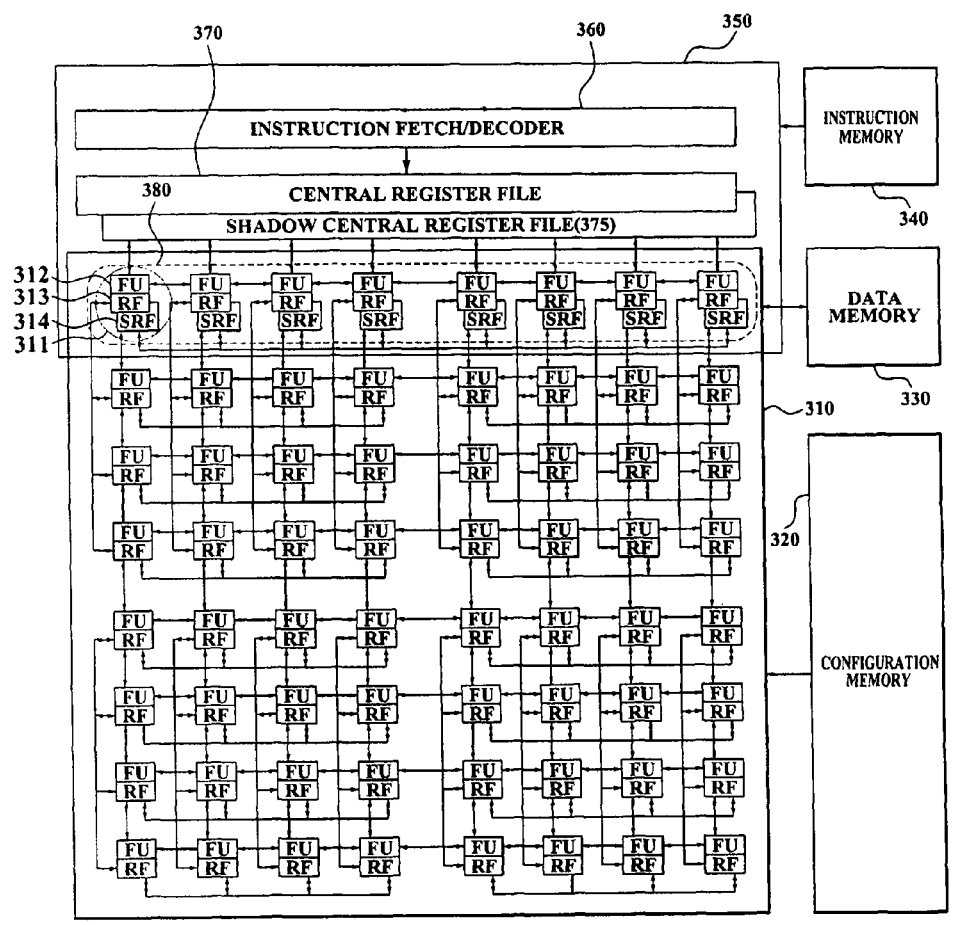
FIG. 3 is a diagram illustrating a tightly-coupled coarse grained array architecture including shadow register files, according to an exemplary embodiment of the present invention.

FIG. 3 is a diagram illustrating a tightly-coupled coarse grained array architecture including shadow register files, according to an exemplary embodiment of the present invention.

In FIG. 3, a coarse grained array (CGA) 310 includes a plurality of processing elements 311. One processing element 311 includes a function unit 312 and register file 313. A function unit performs a computation, and a register file is a group of registers that temporarily stores data used by the function unit.

A processor of FIG. 3 is a processor of a tightly-coupled coarse grained array architecture. A tightly-coupled architecture has an array mode and an instruction set processor mode. In the array mode, the function units of the coarse grained array 310 are performed according to a configuration stored in a configuration memory. Accordingly, in the array mode, processing elements 380 operate as one part of the coarse grained array 310. In the instruction set processor mode, predetermined function units are performed in the function units of the coarse grained array 310. For example, in the instruction set processor mode, the processing elements 380 operate and other processing elements do not operate. In the present invention, predetermined processing elements 380 selected from the plurality of processing elements included in the coarse grained array 310 are used as a host processor. Accordingly, general instructions are performed by the predetermined processing elements 380 selected from the coarse grained array 310, and instructions requiring repeated executions, such as a loop, are performed by the entire coarse grained array 310 including the predetermined processing elements 380.

In the present invention, there is a plurality of shadow register files corresponding to each of the register files included in the predetermined processing elements 380 used in the instruction set processor mode. The predetermined processing elements 380 used both in the array mode and the instruction set processor mode include not only a function unit and a register file, but also a shadow register file, respectively. For example, the processing element 311 includes the register file 313 and the shadow register file 314 corresponding to the register file 313. The plurality of the shadow register files 314 is used in exception handling, and the register files included in the predetermined processing elements 380 from the plurality of processing elements are excluded from use in performing the exception handling. When the register files included in the predetermined processing elements 380 are used, the plurality of shadow register files are not used, and when the plurality of shadow register files are used, the register files included in the predetermined processing elements 380 are not used.

Only the predetermined processing elements 380 used both in the instruction set processor mode from the processing elements included in the coarse grained array 310 include a shadow register file. The other processing elements do not include a shadow register file. Accordingly, though a size of an array of the coarse grained array becomes larger, the number of additionally needed shadow register files does not increase as much.

A central register file 370 includes a plurality of register files. The central register file 370 is located outside the coarse grained array 310 and stores intermediate values being computed by the coarse grained array 310.

A shadow central register file 375 includes a plurality of register files. Each of the plurality of register files corresponds to each of the plurality of register files included in the central register file 370. The shadow central register file 375 is used in performing exception handling, and the central register file 370 is not used in performing the exception handling. Namely, when the central register file 370 is used, the shadow central register file 375 is not used, and when the shadow central register file 375 is used, the central register file 370 is not used.

As described above, the central register file 370 and the register files included in the predetermined processing elements 380 used in the instruction set processor mode are excluded from use in performing the exception handling, and the shadow central register file 375 and the plurality of the shadow register files 314 are used in performing the exception handling.

For example, in an exemplary embodiment of the present invention, when an exception occurs in the array mode in which the processing elements of the coarse grained array 310 perform, operations of the processing elements of the coarse grained array 310 are frozen, the function units included in the predetermined processing elements 380 perform the exception handling by using the plurality of shadow register files. After finishing the exception handling, the operations of the processing elements of the coarse grained array 310 are restarted. Accordingly, since the exception handling is performed by using the plurality of shadow registers, there is no need to additionally store the values of the central register file 370 and the register files, which are stored when the exception occurs in the conventional art. Namely, after finishing the exception handling, the values stored in the register files included in the processing elements of the coarse grained array 310 are identical with the values stored in the register files included in the processing elements before the exception occurs. Accordingly, the suspended task by an exception can be resumed by restarting the coarse grained array 310 after the exception handling. Thus, according to an aspect of the present invention, when an exception occurs, partially computed values of the tasks performed in the array mode may not be invalidated and may be used as is.

A case in which an exception occurs in the instruction set processor mode is the same as described above. In this case, in an exemplary embodiment of the present invention, the function units performing the instruction set processor mode process the exception by using the shadow register files 314 instead of the register files 313. After the exception handling is finished, the function units included in the predetermined processing elements 380 restart performing an interrupted task by using the central register file 370 and the register files 313 included in the predetermined processing elements 380.

The configuration memory 320 stores information associated with a configuration of the coarse grained array 310. According to the configuration stored in the configuration memory 320, the coarse grained array 310 may define a connection state between the processing elements included in the coarse grained array 310 as well as a function of the function units included in the processing elements. For example, the function unit 312 included in the processing element 311 may be established to perform an addition operation and may be changed into a function unit performing a multiplication operation.

An operation performing a repeated computation, such as a loop operation, is processed by repeatedly performing the loop operation after changing the configuration of the coarse grained array 310 via one configuration stored in the configuration memory 320. When a new loop operation has to be performed after a previous loop operation is finished, the configuration of the coarse grained array 310 is changed into a configuration for performing the new loop operation. As described above, the configuration memory 320 stores information with respect to the configuration of the coarse grained array 310.

A data memory 330 is located outside the coarse grained array 310 and stores data, and an instruction memory 340 is located outside the coarse grained array 310 and stores instructions.

Also, when the predetermined processing elements 380 of the coarse grained array 310 are used as a host processor, a very long instruction word architecture (VLIW) may be used. In this case, instruction fetch/decoder 360, the central register file 370, and the predetermined processing elements 380 form the VLIW architecture 350.

In exemplary embodiments of the present invention, each of the plurality of shadow register files is corresponding to each of the register files included in the processing elements 380 used in the instruction set processor mode. When an exception occurs while operating in the array mode or the instruction set processor mode by using the register files, the function units of the processing elements 380 perform exception handling by using the shadow register file while the values of the register files are maintained as is. After the exception handling is finished, processing of an interrupted task is resumed by using the register files.

Figure 4:
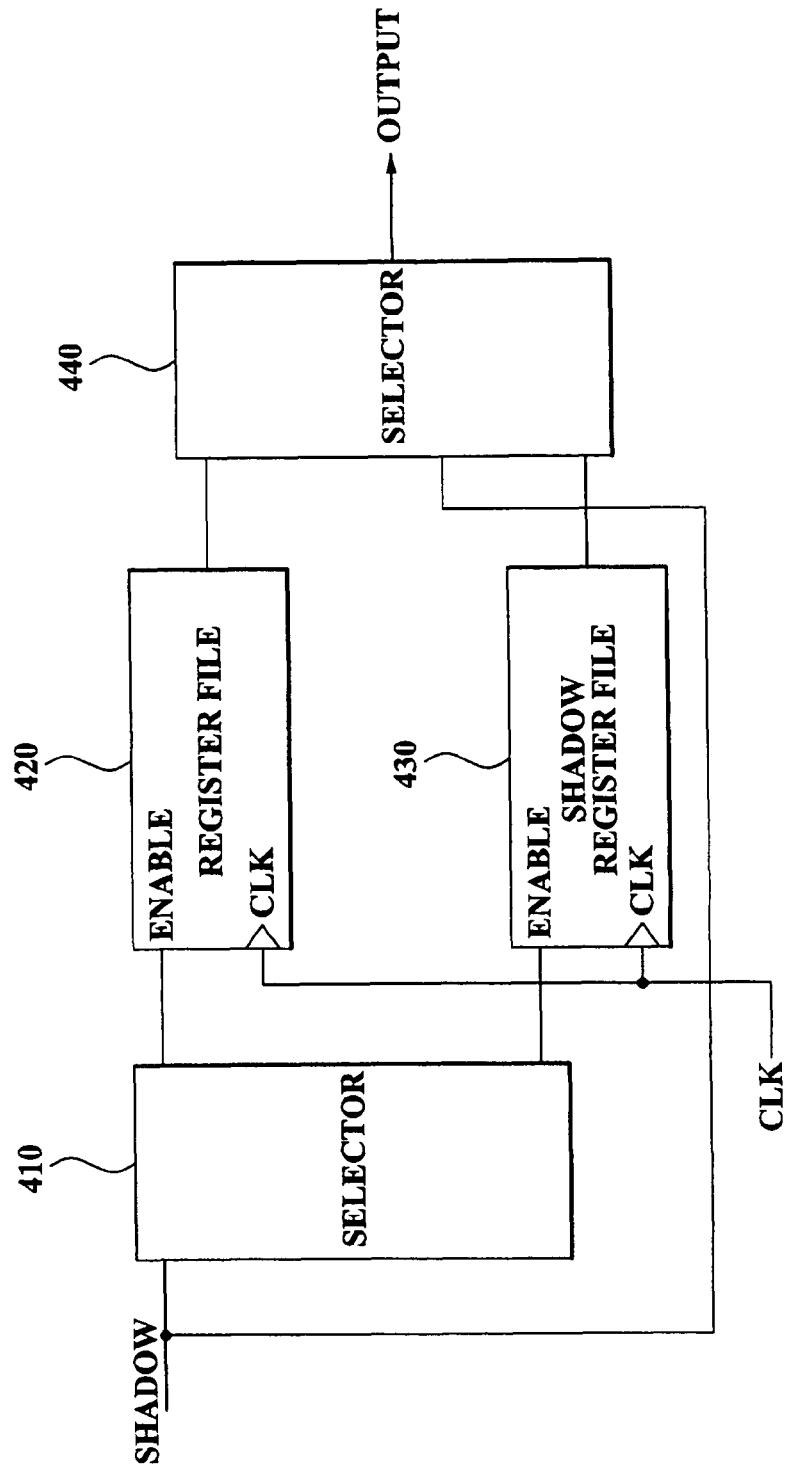
FIG. 4 is a block diagram illustrating a block diagram of a circuit for selecting between register files and shadow register files, according to an exemplary embodiment of the present invention.

FIG. 4 is a block diagram illustrating a block diagram of a circuit for selecting between register files and shadow register files, according to an exemplary embodiment of the present invention.

Referring to FIG. 4, a register file 420 and a shadow register file 430 are included in one processing element. When an exception does not occur, a selector 410 enables the register file 420 and disables the shadow register file 430. Then, the function unit included in the processing element operates by using the register file 420. A selector 440 selects the register file 420 to output a value for an output of the processing element. Then, when an exception occurs, the selector 410 selects the shadow register file 430. In this case, a value stored in the register file is maintained as is. The function unit included in the processing element operates by using the shadow register file 430, and a result of an operation is outputted by the selector 440.

Referring to FIG. 3, when the register files included in the predetermined processing elements 380 from the plurality of processing elements included in the coarse grained array 310 are used, the plurality of shadow register files are not used, and when the plurality of shadow register files are used, the register files included in the predetermined processing elements 380 from the plurality of the processing elements are not used.

The central register file 370 and the shadow central register file 375 may operate as the operation of the register file 420 and the shadow register file 430 described above. Namely, when the central register file 370 is used, the shadow central register file 375 is not used, and when the shadow central register file 375 is used, the central register file 370 is not used. According to whether the exception handling is performed, only one of the central register file and the shadow central register file is used.

Referring to FIG. 3, in the array mode, the function units in the coarse grained array 310 of the processor operate by using the register files included in the coarse grained array 310 and the central register file 370. In the instruction set processor mode, the function units of the predetermined processing elements 380 from the plurality of processing elements included in the coarse grained array 310 operate by using the register files of the predetermined processing elements 380 and the central register file 370. When an exception occurs, the function units of the predetermined processing elements 380 from the plurality of processing elements included in the coarse grained array 310 operate by using the shadow register files of the predetermined processing elements 380 and the shadow central register file 375.

Figure 5A:
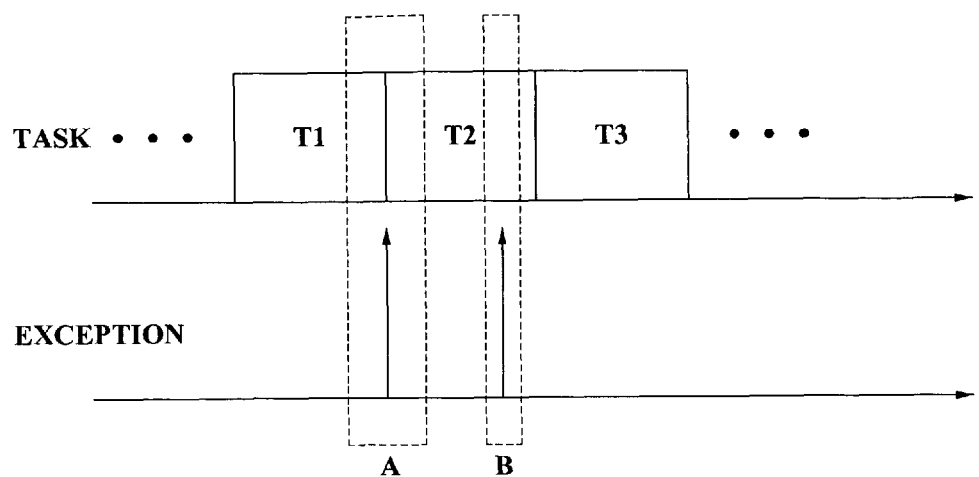
FIGS. 5A-5C are diagrams illustrating a timing of exception handling when an exception occurs, according to an exemplary embodiment of the present invention.
Figure 5B:
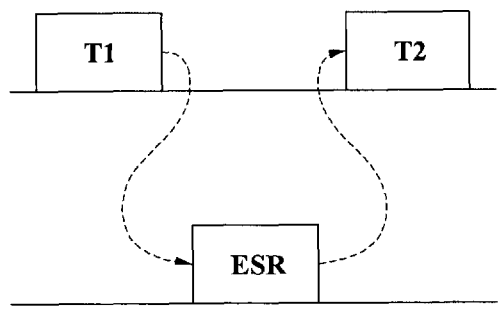
Figure 5C:
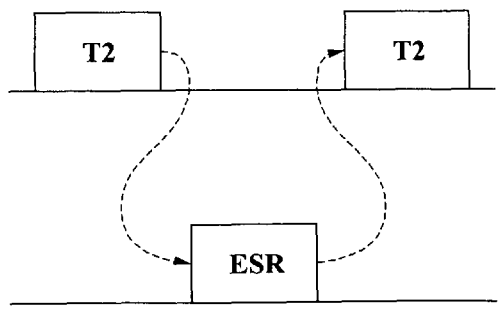

FIGS. 5A-5C are diagrams illustrating a timing of exception handling when an exception occurs.

Many interrupt exceptions occurs in a real-time operating system. For example, there may be timer interrupts occurring at approximately every 1 ms, and Ethernet interrupts. An MPEG-1 audio layer 3 requires task scheduling with a period of about 26 ms, and a video data of a National Television System Committee (NTSC) format requires task scheduling of about 33 ms. However, there is a case in which an exception does not affect a scheduling of a task that is running when the exception occurs.

In FIG. 5A, in the case of an exception A, a task T1 that is running has to be switched into a task T2 for handling of the exception A. In this case, as shown in FIG. 5B, the task T1 is performed, an exception service routine (ESR) is processed, and the task T2 is performed. In this case, if the task T1 is processed by using the coarse grained array 310, all of the register files and a context of the central register file included in the coarse grained array 310 are stored. Also, when the task T1 is performed in the instruction set processor mode, the register files of the predetermined processing elements 380 and a context of the central register file used in the instruction set processor mode have to be stored. In this case, the exception handling requires the switch of task from the suspended task to the other task.

In the case of an exception B of FIG. 5A, the exception B does not require the switch of task of the running task T2. As shown in FIG. 5C, even though an exception occurs while performing the task T2, the task does not have to be switched.

Many exceptions occurring in the described real-time operating system do not actually require a task switch, as described above. Consequently, performing the context switch for this kind of exceptions is an unnecessary overhead. Particularly, in the case of a reconfigurable architecture, since there is a large number of register files included in an array, a size of a context is very large and an overhead required for a context switch is very huge.

In exemplary embodiments of the present invention, when an exception occurs, the function units included in the predetermined processing elements 380 perform exception handling by using the shadow central register file 375 and the plurality of shadow register files included in the predetermined processing elements 380. In this case, when the exception does not cause a switch of a running task, a context switch is not required, thereby reducing overhead caused by the context switch.

Figure 6:
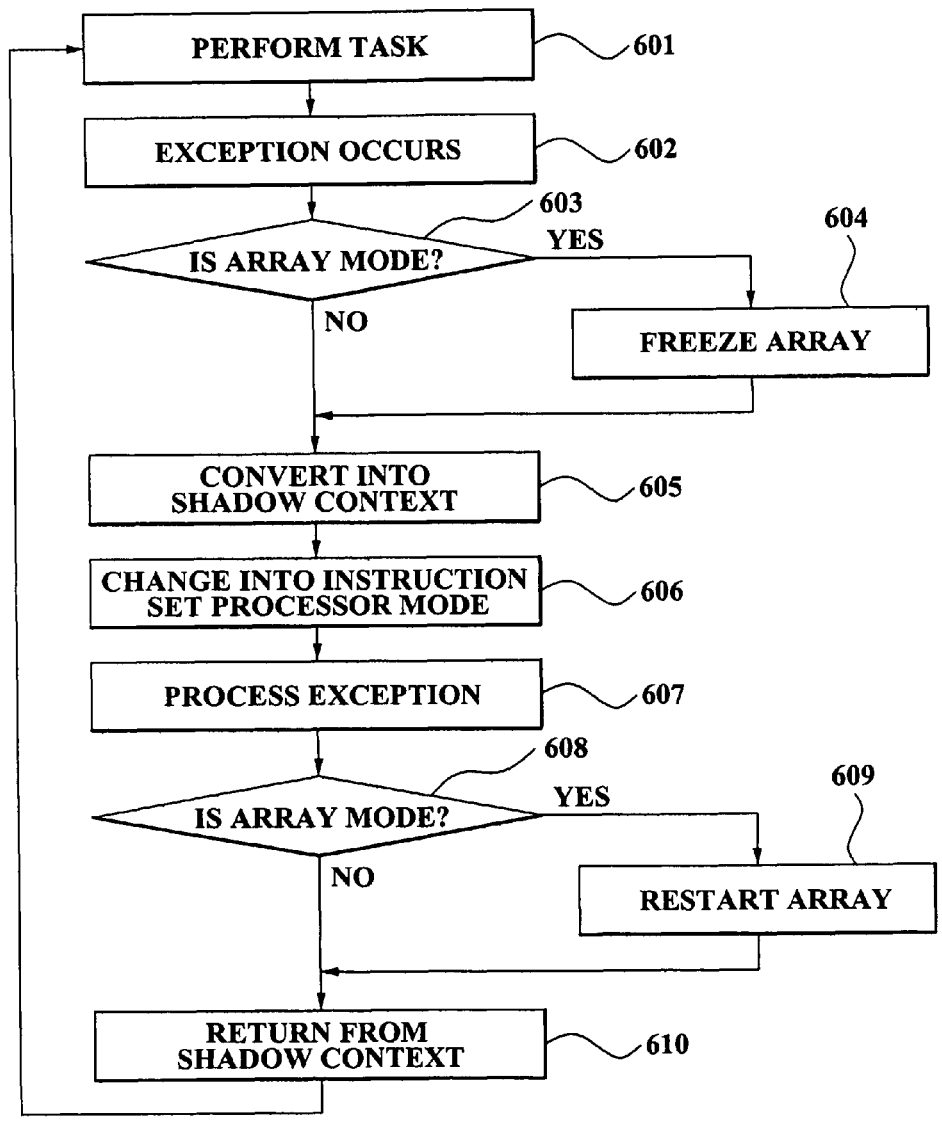
FIG. 6 is a flowchart illustrating an order of a method of exception handling in a reconfigurable architecture according to an exemplary embodiment of the present invention.

FIG. 6 is a flowchart illustrating an order of a method of exception handling in a reconfigurable architecture according to an exemplary embodiment of the present invention. The processor according to an exemplary embodiment of the present invention includes the coarse grained array 310 including a plurality of processing elements and the central register file 370 including a plurality of register files.

In 601, the processor performs a task. Depending upon characteristics of the task, the task may be performed in an array mode or instruction set processor mode. A task requiring a repeated execution, such as a loop, is processed in the array mode.

In 602, an exception occurs. In 603, the processor determines whether the exception occurs in the array mode of the coarse grained array 310.

If the exception occurs in the array mode, operations of the processing elements of the coarse grained array 310 are suspended. Namely, the coarse grained array 310 is frozen in 604. Then, values included in the register files included in the coarse grained array 310 are maintained as is and are not additionally stored in another storage medium such as a memory.

If the exception occurs in the instruction set processor mode, the processor switches to a shadow context in 605. That is, the processor executes operations by using a shadow central register file and a plurality of shadow register files, instead of the central register file and a plurality of register files included in predetermined processing elements selected from the plurality of processing elements. The shadow central register file includes a plurality of register files, and each of the plurality of register files of the shadow register file corresponds to each of the plurality of register files included in the central register file. Each of the plurality of shadow register files corresponds to each of a plurality of register files included in predetermined processing elements selected from the plurality of processing elements.

The processor changes into the instruction set processor mode in 606, and performs exception handling in 607. In this case, if the exception does not cause a task switching of a running task, a context switch is not required after the exception handling. Also, in the case of the array mode, after performing the operation of 604, the operations of 605, 606, and 607 are performed. Namely, the function units included in the predetermined processing elements 380 from the plurality of processing elements of the coarse grained array 310 perform the exception handling by using the shadow central register file 375 and the plurality of shadow register files. Since the shadow register files and the shadow central register file are used in performing the exception, the values of the register files and the central register file of the coarse grained array 310 are not require to be additionally stored. Accordingly, the value of the central register file and the values of the register files included in the predetermined processing elements from the plurality of processing elements are the same before and after the exception handling.

The shadow central register file includes a plurality of register files. Each of the plurality of register files is corresponding to each of the plurality of register files included in the central register file. Each of the plurality of shadow register files is corresponding to each of the register files included in the predetermined processing elements from the plurality of processing elements.

When the exception handling is finished, in 608, whether the exception occurs in the array mode is determined. If the exception occurs in the array mode, the processor restarts the operations of the processing elements of the coarse grained array 310 in 609. The processor returns from the shadow context in 610, and resumes the task that the coarse grained array 310 performed before the exception occurs. In this case, the values when the operation of the coarse grained array 310 is interrupted due to the exception occurrence are stored as is in the register files of the coarse grained array and the central register file. Therefore, the coarse grained array 310 can finish the interrupted task by using the values stored in the register files of the coarse grained array and the central register file and performing the successive operation of the task.

As a result of the determination of 608, if the exception occurs in the instruction set processor mode, the processor returns from the shadow context and performs the interrupted task in 610. After finishing the exception handling, the function units included in the predetermined processing elements perform the task by using the central register file 370 and the register files included in the predetermined processing elements 380. In this case, the values when the operation of the coarse grained array 310 is interrupted due to the exception occurrence are stored as is in the register files of the coarse grained array and the central register file. Therefore, the coarse grained array 310 can finish the interrupted operation by using the values stored in the register files of the coarse grained array and the central register file.

Also, the exemplary embodiments of the present invention may include a computer readable storage medium including a program instruction for executing various operations realized by a computer or a transmission media. The computer readable storage medium may include a program instruction, a data file, and a data structure, separately or cooperatively. The program instructions and the storage media may be those specially designed and constructed for the purposes of the present invention, or they may be of the kind well known and available to those skilled in the art of computer software arts. Examples of computer readable storage media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. Examples of transmission media may include optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter.

As described above, though exemplary embodiments of the present invention are described based on a case in which a coarse grained array is tightly coupled, the present invention can be applied to other types of reconfigurable architectures in addition to the coarse grained array.

As described above, the processor according to an exemplary embodiment of the present invention may effectively process an exception in a tightly-coupled coarse grained array architecture. Also, according to an aspect of the present invention, when an exception occurs while the tightly-coupled coarse grained array architecture operates in an array mode or instruction set processor mode, a cost for storing and restoring a context can be reduced.

Also, in the case of an array structure, since a size of a context is very large, the cost of storing and restoring the context is very high. According to an aspect of the present invention, with respect to an exception that is not directly associated with a schedule of a task, the exception may be processed without storing or restoring a context, thereby reducing overhead due to a context switch.

Also, in a real-time operating system, since many interrupt exceptions have to be processed, there is a difficulty in employing a reconfigurable architecture with a great overhead of the context switch in the real-time operating system. However, according to an aspect of the present invention, many interrupt exceptions occurring in the real-time operating system may be processed without storing and restoring a context, thereby being advantageous to a reconfigurable architecture to the real-time operating system.

Also, in the case of the real-time operating system, exception handling is performed in a short time. However, if an exception is processed in an array structure after storing a large context, it is difficult to process the exception in a short time. However, according to an aspect of the present invention, since an exception is processed by directly switching to a shadow context when the exception occurs, the exception may be quickly processed.

Also, the number of added shadow register files and shadow central register in the present invention are smaller compared to the number of the entire register files of a coarse grained array. Therefore, even though the present invention is applied to a coarse grained array of a large size, an increase in a size of the processor due to the added shadow register files and shadow central register is very small. Namely, according to an aspect of the present invention, a size of a resource used in an instruction set processor mode for processing an exception is irrelevant to a size of a context of a reconfigurable array. Accordingly, the present invention may be applied to a reconfigurable architecture including a large sized coarse grained array.

Although several exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A hardware processor comprising:
a tightly-coupled coarse grained array including a plurality of processing elements arranged in an array structure;
a central register file used in an array mode and an instruction set processor mode of the coarse grained array, wherein the central register file includes a first plurality of register files; and
a shadow central register file used in an exception handling mode of the coarse grained array for handling an exception, wherein the shadow central register file includes a second plurality of register files, each of the second plurality of register files corresponding to a respective one of the first plurality of register files included in the central register file,
wherein a predetermined subset of the plurality of processing elements contain function units, register files used in the array mode and the instruction set processor mode, and shadow register files used in the exception handling mode of the coarse grained array, and wherein a remaining subset of the plurality of processing elements contain the function units and the register files used in the array mode and do not contain the shadow register files, and
wherein when the exception occurs, the function units included in the predetermined subset of the plurality of processing elements process the exception in the exception handling mode by using the shadow central register file and the plurality of shadow register files,
wherein the shadow central register file is excluded from use when the central register file is used, and the central register file is excluded from use when the shadow central register file is used, and
wherein the predetermined subset of the plurality of processing elements are used in both the array mode and the instruction set processor mode and the remaining subset of the plurality of processing elements are used only in the array mode,
wherein, at a time the exception occurs, values stored in the central register file, values stored in the register files of the predetermined subset of the plurality of processing elements, and values stored in the register files of the remaining subset of the plurality of processing elements are maintained stored therein throughout the exception handling mode and are the same at both a start and a finish of the exception handling mode.

2. The hardware processor of claim 1, wherein the exception is a kind of exception that does not affect scheduling of a task that is running when the exception occurs.

3. The hardware processor of claim 1, wherein, when the exception occurs in the array mode where the plurality of processing elements of the coarse grained array execute operations, the plurality of processing elements of the coarse grained array is frozen and the function units included in the predetermined subset of the plurality of processing elements process the exception by using the shadow central register file and the plurality of shadow register files.

4. The hardware processor of claim 3, wherein, after processing the exception, an operation of the plurality of processing elements of the coarse grained array is restarted.

5. The hardware processor of claim 4, wherein, after processing the exception, values stored in a plurality of register files included in the plurality of processing elements of the coarse grained array are identical with values stored in the plurality of register files included in the plurality of processing elements of the coarse grained array before the exception occurs.

6. The hardware processor of claim 1, wherein, if the exception occurs in an instruction set processor mode where the predetermined subset of the plurality of processing elements execute operations, after processing the exception, the function units included in the predetermined processing elements perform an operation by using the central register file and the plurality of register files included in the predetermined subset of the plurality of processing elements.

7. The hardware processor of claim 1, wherein:
the plurality of shadow register files are excluded from use when the register files included in the predetermined subset of the plurality of processing elements selected from the plurality of processing elements are used; and
the register files included in the predetermined subset of the plurality of processing elements selected from the plurality of processing elements are excluded from use when the plurality of shadow register files are used.

8. The hardware processor of claim 1, wherein:
the plurality of processing elements of the coarse grained array execute operations in an array mode; and
the predetermined subset of the plurality of the processing elements execute operations in an instruction set processor mode.

9. The hardware processor of claim 1, wherein the tightly-coupled coarse grained array comprising the processing elements is a single processor, and, in the array mode, instructions requiring repeated executions are performed by the processing units according to the configuration stored in the configuration memory, and
the predetermined subset of the plurality of processing elements are used by a host processor, and, in the instruction set processor mode, general instructions of the host processor are performed by the predetermined subset of the plurality of processing elements.

10. The hardware processor of claim 1, wherein the exception is handled without storing the values stored in the central register file, the register files of the predetermined subset of the plurality of processing elements, and the register files of the remaining subset of the plurality of processing elements in another location.

11. A method of processing an exception in a processor comprising a tightly-coupled coarse grained array including a plurality of processing elements arranged in an array structure, a central register file used in an array mode and an instruction set processor mode of the coarse grained array wherein the central register file includes a first plurality of register files, a shadow central register file used in an exception handling mode of the coarse grained array for handling the exception, wherein the shadow central register file includes a second plurality of register files wherein each of the second plurality of register files correspond to a respective one of the first plurality of register files included in the central register file,
- wherein a predetermined subset of the plurality of processing elements contain function units, register files used in the array mode and the instruction set processor mode, and shadow register files used in the exception handling mode of the coarse grained array, and a remaining subset of the plurality of processing elements contain the function units and the register files used in the array mode and do not contain the shadow register files, and
- wherein the remaining subset of the plurality of processing elements are used only in the array mode, the method comprising:
- processing the exception by the function units in the predetermined subset of the plurality of processing elements by using the shadow central register file and the plurality of shadow register files, the predetermined subset of the plurality of processing elements are selected from among the plurality of processing elements and are used both in the array mode and the instruction set processor mode of the coarse grained array,
- wherein, at a time the exception occurs, values stored in the central register file, values stored in the register files of the predetermined subset of the plurality of processing elements, and values stored in the register files of the remaining subset of the plurality of processing elements are maintained stored therein throughout the exception handling mode and are the same at both a start and a finish of the exception handling mode.

12. The method of claim 11, wherein:
- a value of the central register file after processing the exception is identical to a value of the central register file before processing the exception, and
- values of the register files included in the predetermined subset of the plurality of processing elements after processing the exception are identical to values of the register files included in the predetermined subset of the plurality of processing elements before processing the exception.

13. The method of claim 11, further comprising:
- determining whether the exception occurs in an array mode where the plurality of processing elements of the coarse grained array execute operations; and
- freezing the plurality of processing elements of the coarse grained array when the exception occurs in the array mode.

14. The method of claim 13, further comprising:
- restarting the plurality of processing elements of the coarse grained array after processing the exception.

15. The method of claim 11, further comprising:
- determining whether the exception occurs in an instruction set processor mode where the predetermined subset of the plurality of processing elements execute operations; and
- executing an operation by using the central register file and register files included in the predetermined processing elements after processing the exception, if the exception occurs in the instruction set processor mode,
- wherein the operation is executed by the function units included in the predetermined subset of the plurality of processing elements.

16. The method of claim 11, wherein the tightly-coupled coarse grained array comprising the processing elements is a single processor, and, in the array mode, instructions requiring repeated executions are performed by the processing units according to the configuration stored in the configuration memory, and
- the predetermined subset of the plurality of processing elements are used by a host processor, and, in the instruction set processor mode, general instructions of the host processor are performed by the predetermined subset of the plurality of processing elements.

17. The method of claim 11, wherein the exception is handled without storing the values stored in the central register file, the register files of the predetermined subset of the plurality of processing elements, and the register files of the remaining subset of the plurality of processing elements in another location.

18. A computer readable storage medium having a program recorded therein, wherein the program performs a method of processing an exception in a processor comprising a tightly-coupled coarse grained array including a plurality of processing elements arranged in an array structure, a central register file used in an array mode and an instruction set processor mode of the coarse grained array wherein the central register file includes a first plurality of register files, a shadow central register file used in an exception handling mode of the coarse grained array wherein the shadow central register file includes a second plurality of register files wherein each of the second plurality of register files correspond to a respective one of the first plurality of register files included in the central register file,
- wherein a predetermined subset of the plurality of processing elements contain function units, register files used in the array mode and the instruction set processor mode, and shadow register files used in the exception handling mode of the coarse grained array, and a remaining subset of the plurality of processing elements contain the function units and the register files used in the array mode and do not contain the shadow register files, and
- wherein the remaining subset of the plurality of processing elements are used only in the array mode, the method comprising:
- processing the exception by the function units in the predetermined subset of the plurality of processing elements by using the shadow central register file and the plurality of shadow register files, the predetermined subset of the plurality of processing elements are selected from among the plurality of processing elements and are used both in the array mode and the instruction set processor mode of the coarse grained array,
- wherein, at a time the exception occurs, values stored in the central register file, values stored in the register files of the predetermined subset of the plurality of processing elements, and values stored in the register files of the remaining subset of the plurality of processing elements are maintained stored therein throughout the exception handling mode and are the same at both a start and a finish of the exception handling mode.

19. The computer readable storage medium of claim 18, wherein the method further comprises:
   determining whether the exception occurs in an array mode where the plurality of processing elements of the coarse grained array execute operations; and
   freezing the plurality of processing elements of the coarse grained array if the exception occurs in the array mode.

20. The computer readable storage medium of claim 19, wherein the method further comprises:
   restarting the plurality of processing elements of the coarse grained array after processing the exception.

21. The computer readable storage medium of claim 18, wherein the method further comprises:
   determining whether the exception occurs in an instruction set processor mode where the predetermined subset of the plurality of processing elements execute operations; and
   executing an operation by using the central register file and register files included in the predetermined processing elements after processing the exception, if the exception occurs in the instruction set processor mode,
   wherein the operation is executed by the function units included in the predetermined subset of the plurality of processing elements.

22. The computer readable storage medium of claim 18, wherein the tightly-coupled coarse grained array comprising the processing elements is a single processor, and, in the array mode, instructions requiring repeated executions are performed by the processing units according to the configuration stored in the configuration memory, and
   the predetermined subset of the plurality of processing elements are used by a host processor, and, in the instruction set processor mode, general instructions of the host processor are performed by the predetermined subset of the plurality of processing elements.

23. The computer readable storage medium of claim 18, wherein the exception is handled without storing the values stored in the central register file, the register files of the predetermined subset of the plurality of processing elements, and the register files of the remaining subset of the plurality of processing elements in another location.

24. A hardware processor comprising:
   a tightly-coupled coarse grained array including a plurality of processing elements arranged in an array structure, wherein a predetermined subset of the plurality of processing elements contain function units, register files used in an array mode and in an instruction set processor mode, and shadow register files used in an exception handling mode, and wherein a remaining subset of the plurality of processing elements contain the function units and the register files used in the array mode and do not contain the shadow register files;
   a central register file used in the array mode and the instruction set processor mode; and
   a shadow central register file used in the exception handling mode for handling an exception,
   wherein, when the exception occurs, the function units included in the predetermined subset of the plurality of processing elements use the shadow register files instead of the register files,
   wherein, after processing the exception the function units included in the predetermined subset of the plurality of processing elements use the register files again, and
   wherein the predetermined subset of the plurality of processing elements are used in both the array mode and the instruction set processor mode and the remaining subset of the plurality of processing elements are used only in the array mode,
   wherein, at a time the exception occurs, values stored in the central register file, values stored in the register files of the predetermined subset of the plurality of processing elements, and values stored in the register files of the remaining subset of the plurality of processing elements are maintained stored therein throughout the exception handling mode and are the same at both a start and a finish of the exception handling mode.

25. The hardware processor of claim 24, wherein the tightly-coupled coarse grained array comprising the processing elements is a single processor, and, in the array mode, instructions requiring repeated executions are performed by the processing units according to the configuration stored in the configuration memory, and
   the predetermined subset of the plurality of processing elements are used by a host processor, and, in the instruction set processor mode, general instructions of the host processor are performed by the predetermined subset of the plurality of processing elements.

26. The hardware processor of claim 24, wherein the exception is handled without storing the values stored in the central register file, the register files of the predetermined subset of the plurality of processing elements, and the register files of the remaining subset of the plurality of processing elements in another location.

* * * * *